(12) United States Patent
Tanaka et al.

(10) Patent No.: US 7,597,831 B2
(45) Date of Patent: Oct. 6, 2009

(54) SOLUTION CASTING APPARATUS AND SOLUTION CASTING METHOD

(75) Inventors: Hiromasa Tanaka, Minami-ashigara (JP); Ryuhei Yoshida, Minami-ashigara (JP); Yuji Suzuki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/864,704

(22) Filed: Sep. 28, 2007

(65) Prior Publication Data

US 2008/0081118 A1 Apr. 3, 2008

(30) Foreign Application Priority Data

Sep. 28, 2006 (JP) .............................. 2006-265280

(51) Int. Cl.
*B29C 39/14* (2006.01)
(52) U.S. Cl. ........................................ 264/217; 264/212
(58) Field of Classification Search .................. 264/216, 264/217
See application file for complete search history.

(56) References Cited

U.S. PATENT DOCUMENTS

| 5,188,789 A | * | 2/1993 | Nishiura ................. 264/171.13 |
| 2005/0212172 A1 | * | 9/2005 | Sakamaki .................... 264/216 |
| 2006/0076707 A1 | * | 4/2006 | Sugiura ...................... 264/234 |

FOREIGN PATENT DOCUMENTS

JP 2003-236863 A 8/2003

* cited by examiner

*Primary Examiner*—Monica A Huson
(74) *Attorney, Agent, or Firm*—Sughrue Mion, PLLC

(57) ABSTRACT

A dope producing apparatus is provided with a first feed line for sending polymer solution from a fourth tank to a solution casting apparatus. The first feed line is provided with a first orifice for adding dilute liquid to the polymer solution; a first inline mixer for inline-mixing the polymer solution and the dilute liquid to produce a mixture; a second orifice for adding matting liquid to the mixture; and a second inline mixer for mixing the mixture and the matting liquid to produce a first dope.

3 Claims, 5 Drawing Sheets

SOLUTION CASTING APPARATUS AND SOLUTION CASTING METHOD

FIELD OF THE INVENTION

The present invention relates to a solution casting apparatus and a solution casting method for producing a cellulose acylate film.

BACKGROUND OF THE INVENTION

A cellulose acylate film is used as a base of a photographic film due to its toughness and flame retardancy. Moreover, as excellent in optical isotropy, the cellulose acylate film is also used as a protective film for a polarizing filter in a liquid crystal display (LCD) whose market becomes larger recently.

The cellulose acylate film is usually produced by a solution casting method. In the solution casting method, a dope containing cellulose acylate, additive and solvent is cast onto a running support to form a casting film. After having possessed a self-supporting property, the casting film is peeled as a wet film. The wet film is dried and wound as the cellulose acylate film in a roll form.

In the solution casting method, fine particles are generally added to the dope for the sake of scratch resistance of film, improvement of film conveyance, stick resistance of wound film, and the like. The fine particle is also referred to as matting agent, blocking agent, anti-creak agent, and the like, and has conventionally been used. When the fine particles are mixed in an entire film, it may deteriorate the optical properties of the film. Therefore, when the film is a multilayered film, the fine particles are preferably mixed only in an external layer of the film. As disclosed in Japanese Patent Laid-open Publication No. 2003-236863, a dope is separated into two: one is for forming an internal layer of a multilayered film and the other is for forming an external layer of the multilayered film, and matting agents are mixed only into the dope for the external layer. Moreover, dilute liquid is mixed into the dope for the external layer since the thickness of the external layer is preferably smaller than that of the internal layer.

The matting agents and the dilute liquid are mixed into the dope for the external layer according to the following conventional method shown in FIG. 7. According to this method, the number of inline mixers can be reduced. Dilute liquid 2A and matting liquid 2B that contains matting agents and cellulose acylate are firstly joined together. A mixture 2 of the dilute liquid 2A and the matting liquid 2B is added to a dope for forming an external layer of a multilayered film through an orifice 4 that is provided to a pipe 3. The dope for the external layer to which the dilute liquid 2A and the matting liquid 2B have been added is mixed by an inline mixer 6 provided with a number of mixing elements 5.

However, the conventional method has a problem in that a large amount of agglomeration of the matting agents is contained in the dope, which appears as extraneous matters in the produced film.

SUMMARY OF THE INVENTION

It is an object of the present invention to provide a solution casting apparatus and a solution casting method that prevent mixture or adhesion of extraneous matters in a produced film by preventing agglomeration of matting agents in a dope.

Inventors of the present application examined the relation between filtration pressure and passage amount of matting agents in a dope. For this examination, three kinds of dopes for forming an external layer of a multilayered film were prepared. To these dopes, dilute liquid and matting liquid were added according to the conventional method (see FIG. 7). The additive ratio of the dilute liquid and the matting liquid was changed from dope to dope. In a first dope, the matting liquid and the dilute liquid were added with a ratio of 1:0 (the matting liquid was added without dilution). In a second dope, the matting liquid and the dilute liquid were added with a ratio of 1:1 (doubling dilution of the matting liquid). In a third dope, the matting liquid and the dilute liquid were added with a ratio of 1:2 (tripling dilution of the matting liquid). The relation between the filtration pressure and the passage amount of matting agents in the first, second, and third dopes are plotted with symbols □, ○, and △ respectively in a graph of FIG. 1. As can be seen from the graph, the filtration pressure becomes higher as the dilution ratio of the matting liquid becomes higher, which tends to result in more agglomeration of the matting agents.

This tendency was further analyzed, and the following insights were obtained. When the cellulose acylate concentration is high in the liquid containing the matting agents, cellulose acylate 8 moderately intermediates between each of matting agents 7, and so the matting agents 7 are dispersed, as shown in FIG. 2A. When the cellulose acylate concentration is low in the liquid containing the matting agents, the amount of the cellulose acylate 8 that intermediates between each of the matting agents 7 is small, and so the matting agents 7 tend to be agglomerated, as shown in FIG. 2B.

In view of the above results of the examination and the analysis, the inventors of the present application found that the cellulose acylate concentration in the liquid containing the matting agents is lowered in a section shown with an arrow 9 in FIG. 7, that is, the section between where the matting liquid and the dilute liquid are joined together and where the mixture thereof is added to the dope for the external layer. This lowering of the cellulose acylate concentration results in more agglomeration of the matting agents.

In order to achieve the above objects and other objects based on the above insights, a solution casting apparatus of the present invention for producing a multilayered film having a cellulose acylate layer including cellulose acylate and additives, and a matting agent layer including matting agents, cellulose acylate and the additives, includes a running support, a casting die, a first pipe, a second pipe, a dilute liquid supply device, a first inline mixer, a matting agent supply device, a second inline mixer, a peeling device, and a drying device. The casting die casts a first dope forming the cellulose acylate layer and a second dope forming the matting agent layer onto the support such that the first and second dopes are layered. The first pipe is connected to the casting die. The first dope flows through the first pipe to the casting die. The second pipe is also connected to the casting die. The second dope flows through the second pipe to the casting die. The dilute liquid supply device provided to the second pipe adds dilute liquid to the second dope. The first inline mixer provided to the second pipe stirs a mixture of the dilute liquid and the second dope. The matting agent supply device provided to the second pipe at downstream from the first inline mixer adds matting liquid to the second dope. The matting liquid includes the matting agents and cellulose acylate. The second inline mixer provided to the second pipe stirs a mixture of the matting liquid and the second dope. The peeling device peels a casting film having the layered first and second dopes from the support to be a wet film. The drying device dries the wet film to be the multilayered film.

A solution casting method of the present invention for producing a multilayered film having a cellulose acylate layer including cellulose acylate and additives, and a matting agent layer including matting agents, cellulose acylate and the additives, includes the steps of: sending a first dope forming the cellulose acylate layer to a casting die through a first pipe; sending a second dope forming the matting agent layer to the casting die through a second pipe; adding dilute liquid to the second dope using a dilute liquid supply device provided to the second pipe; stirring a mixture of the dilute liquid and the second dope using a first inline mixer provided to the second pipe; adding matting liquid including the matting agents and cellulose acylate to the second dope using a matting agent supply device provided to the second pipe at downstream from the first inline mixer; stirring a mixture of the matting liquid and the second dope using a second inline mixer provided to the second pipe; casting the first dope and the second dope such that the first dope and the second dope are layered on a running support to form a casting film having the matting agent layer and the cellulose acylate layer; peeling the casting film from the support to be a wet film; and drying the wet film to be the multilayered film.

According to the present invention, the dilute liquid is firstly added to the second dope, which forms the matting agent layer, and the mixture thereof is stirred, and then the matting liquid including the matting agents and cellulose acyltate is added to the second dope and the mixture thereof is stirred. Owing to this, the dope is produced without lowering the cellulose acylate concentration in the liquid containing the matting agents. Therefore, the matting agents are prevented from agglomerated, which results in preventing the produced film from having extraneous matters mixed or adhered therein.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

[Material]

Figure 1:
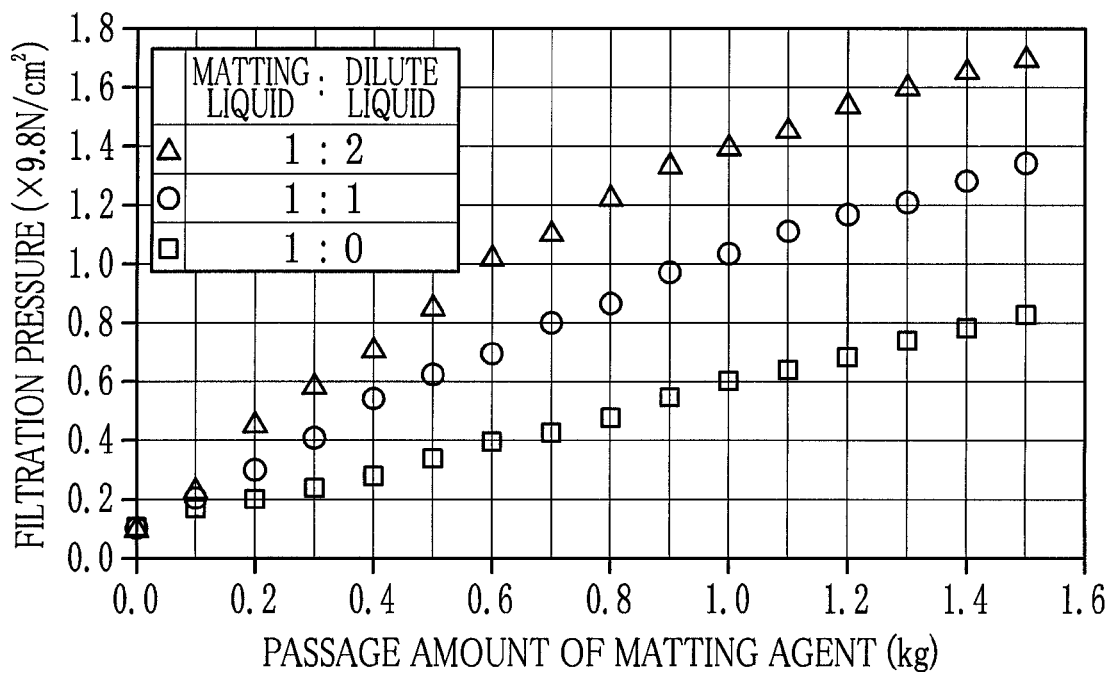
FIG. 1 is a graph illustrating the relation between filtration pressure and passage amount of matting agents in dopes with different ratios of dilute liquid and matting liquid added according to the conventional method.
Figures 2A, 2B:
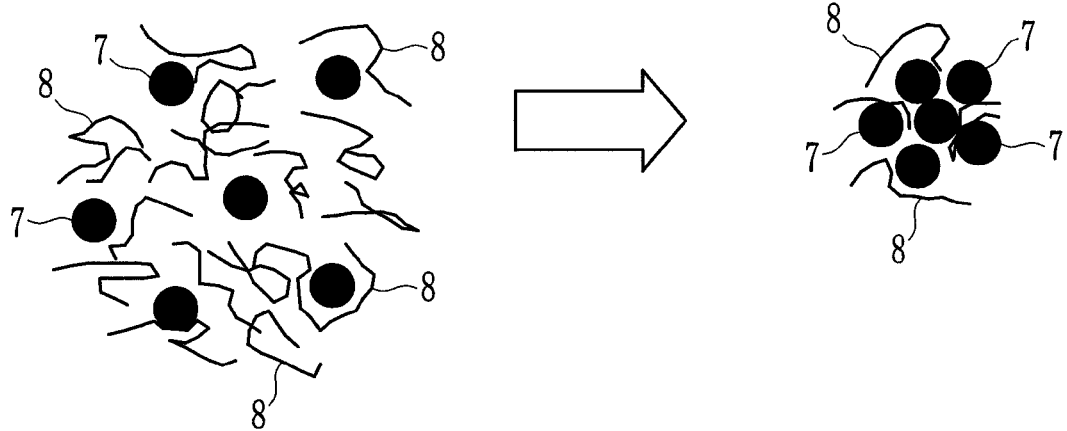
FIGS. 2A and 2B are explanatory views illustrating how the matting agents are agglomerated as the cellulose acylate concentration of a liquid containing cellulose acylate lowers.

As cellulose acylate of this embodiment, triacetyl cellulose (TAC) is especially preferable. TAC may be produced from cotton linter or cotton pulp, or a mixture of materials respectively obtained from cotton linter and cotton pulp, and preferable TAC is produced from cotton linter. It is preferable in cellulose acylate that the degree of substitution of acyl groups for hydrogen atoms on hydroxyl groups of cellulose preferably satisfies all of the following formulae (I), (II) and (III). In these formulae (I)-(III), A is the degree of substitution of acetyl groups for the hydrogen atoms on the hydroxyl groups of cellulose, and B is the degree of substitution of the acyl groups for the hydrogen atoms while each acyl group has carbon atoms whose number is from 3 to 22. It is preferable that at least 90 mass % of TAC are particles having a diameter in the range of 0.1 mm to 4 mm.

$$2.5 \leq A+B \leq 3.0 \quad (I)$$

$$0 \leq A \leq 3.0 \quad (II)$$

$$0 \leq B \leq 2.9 \quad (III)$$

A glucose unit constructing cellulose with $\beta$-1,4 bond has the free hydroxyl groups on $2^{nd}$, $3^{rd}$ and $6^{th}$ positions. Cellulose acylate is polymer in which, by esterification, the hydrogen atoms on the part or all of the hydroxyl groups are substituted by the acyl groups having at least two carbon atoms. The degree of acylation is the degree of the esterification of the hydroxyl groups on the $2^{nd}$, $3^{rd}$ and $6^{th}$ positions. In each hydroxyl group, if the esterification is made at 100%, the degree of acylation is 1. That is, if the esterification is made at 100% in all three hydroxyl groups, the degree of acylation is 3.

Herein, if the acyl group is substituted for the hydrogen atom on the $2^{nd}$ position in the glucose unit, the degree of the acylation is described as DS2 (the degree of substitution by acylation on the $2^{nd}$ position), and if the acyl group is substituted for the hydrogen atom on the $3^{rd}$ position in the glucose unit, the degree of the acylation is described as DS3 (the degree of substitution by acylation on the $3^{rd}$ position). Further, if the acyl group is substituted for the hydrogen atom on the $6^{th}$ position in the glucose unit, the degree of the acylation is described as DS6 (the degree of substitution by acylation on the $6^{th}$ position). The total degree of the acylation, DS2+DS3+DS6, is preferably 2.00 to 3.00, particularly 2.22 to 2.90, and especially 2.40 to 2.88. Further, DS6/(DS2+DS3+DS6) is preferably at least 0.32, particularly at least 0.322, and especially 0.324 to 0.340.

In the present invention, cellulose acylate may be composed of either one kind of the acyl group, or two or more kinds thereof. If there are two or more kinds of acyl groups, one of them is preferably the acetyl group. If the hydrogen atoms on the $2^{nd}$, $3^{rd}$ and $6^{th}$ hydroxyl groups are substituted by the acetyl groups, the total degree of substitution is described as DSA, and if the hydrogen atoms on the $2^{nd}$, $3^{rd}$ and $6^{th}$ hydroxyl groups are substituted by the acyl groups other than the acetyl groups, the total degree of substitution is described as DSB. In this case, the value of DSA+DSB is preferably 2.2 to 2.86, and especially 2.40 to 2.80. Further, DSB is preferably at least 1.50, and especially at least 1.7. According to DSB, the percentage of the substitution on the $6^{th}$ position with respect to that on the $2^{nd}$, $3^{rd}$ and $6^{th}$ positions is at least 28%. However, the percentage is preferably at least 30%, particularly at least 31%, and especially at least 32%. Further, DSA+DSB of the $6^{th}$ position of cellulose acylate is preferably at least 0.75, particularly at least 0.80, and especially at least 0.85. When these sorts of cellulose acylate are used, a solution (or dope) having preferable solubility can be produced, and especially, the solution having preferable solubility to a non-chlorine type organic solvent can be produced. Further, when the above cellulose acylate is used, the produced solution has low viscosity and excellent filterability.

In cellulose acylate, the acyl group having at least 2 carbon atoms may be aliphatic group or aryl group. Such acyl group may be, for example, alkylcarbonyl ester of cellulose, alkenylcarbonyl ester of cellulose, aromatic carbonyl ester of cellulose, and aromatic alkylcarbonyl ester of cellulose, and each of them may have further substitutents. As preferable examples of the compounds, there are propionyl group, butanoyl group, pentanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexanecarbonyl group, oleoyl group, benzoyl group, naphthylcarbonyl group, cinnamoyl group and the like. Among them, particularly preferable groups are propionyl group, butanoyl group, dodecanoyl group, octadecanoyl group, t-butanoyl group, oleoyl group, benzoyl group, naphthylcarbonyl group, cinnamoyl group and the like, and especially preferable groups are propionyl group and butanoyl group.

Further, as solvents for preparing the dope, there are aromatic hydrocarbons (for example, benzene, toluene and the like), hydrocarbon halides (for example, dichloromethane, chlorobenzene and the like), alcohols (for example, methanol, ethanol, n-propanol, n-butanol, diethyleneglycol and the like), ketones (for example, acetone, methylethyl ketone and the like), esters (for example, methyl acetate, ethyl acetate, propyl acetate and the like), ethers (for example, tetrahydrofuran, methylcellosolve and the like) and the like. Note that the dope is a polymer solution or a dispersion liquid in which a polymer is dissolved to or dispersed in the solvent.

The solvents are preferably hydrocarbon halides having 1 to 7 carbon atoms, and especially dichloromethane. In view of the solubility of cellulose acylate, the peelability of a casting film from a support, a mechanical strength of a film, optical properties of the film and the like, it is preferable that one or several sorts of alcohols having 1 to 5 carbon atoms is mixed with dichloromethane. There at the content of the alcohols to the entire solvent is preferably in the range of 2 mass % to 25 mass %, and particularly in the range of 5 mass % to 20 mass %. Concretely, there are methanol, ethanol, n-propanol, iso-propanol, n-butanol and the like. The preferable examples for the alcohols are methanol, ethanol, n-butanol, or a mixture thereof.

Recently, the solvent composition for not using dichloromethane is progressively considered in order to minimize the influence on the environment. To achieve this object, ethers having 4 to 12 carbon atoms, ketones having 3 to 12 carbon atoms, and esters having 3 to 12 carbon atoms are preferable, and a mixture thereof can be used adequately. These ethers, ketones and esters may have a cyclic structure. Further, the compounds having at least two of functional groups in ethers, ketones and esters (namely, —O—, —CO— and —COO—) can be used for the solvent. The solvent may have other functional groups such as alcoholic hydroxyl groups in its chemical structure.

As dilute liquid in the present invention, liquid including methanol and butanol is used. Note that the solvent used for preparing the dope may also be used as the dilute liquid. As matting agents in the present invention, fine particles of silicon dioxide ($SiO_2$) are used. The particles of $SiO_2$ used in this embodiment are commercially available initial particles with little agglomeration at the time of being used for preparing the dope. In the conventional method, the particles of $SiO_2$ may be agglomerated and form secondary particles during the preparation of the dope. However, the agglomeration of the particles can be prevented according to the following method of the present invention.

Note that the detailed explanation of cellulose acylate is made from [0140] to [0195] in Japanese Patent Laid-Open Publication No. 2005-104148, and the descriptions of this publication can be applied to the present invention. Note that the detailed explanations of the solvents and the additive materials (such as plasticizers, deterioration inhibitors, ultraviolet (UV)-absorbing agents, optical anisotropy controllers, retardation controllers, dynes, matting agents, release agents, and the like) are made from [0196] to [0516] in the Japanese Patent Laid-Open Publication No. 2005-104148.

A film that is produced from a cellulose acylate dope according to the present invention may be used for a polarizing plate, a liquid crystal display member and the like due to its high dimensional stability. In view of preventing deterioration when used for the polarizing plate or the liquid crystal display, the UV-absorbing agents are preferably added to the dope. It is preferable that the UV-absorbing agents absorb UV rays whose wavelength is not more than 370 nm well. At the same time, in view of display capability, it is preferable that the UV-absorbing agents hardly absorb visible rays whose wavelength is not less than 400 nm. Concrete examples of the UV-absorbing agents preferably used in the present invention are oxybenzophenone type compounds, benzotriasole type compounds, salicylic acid ester type compounds, benzophenone type compounds, cyanoacrylate type compounds, nickel complex salt type compounds.

[Dope Producing Method]

Figure 3:
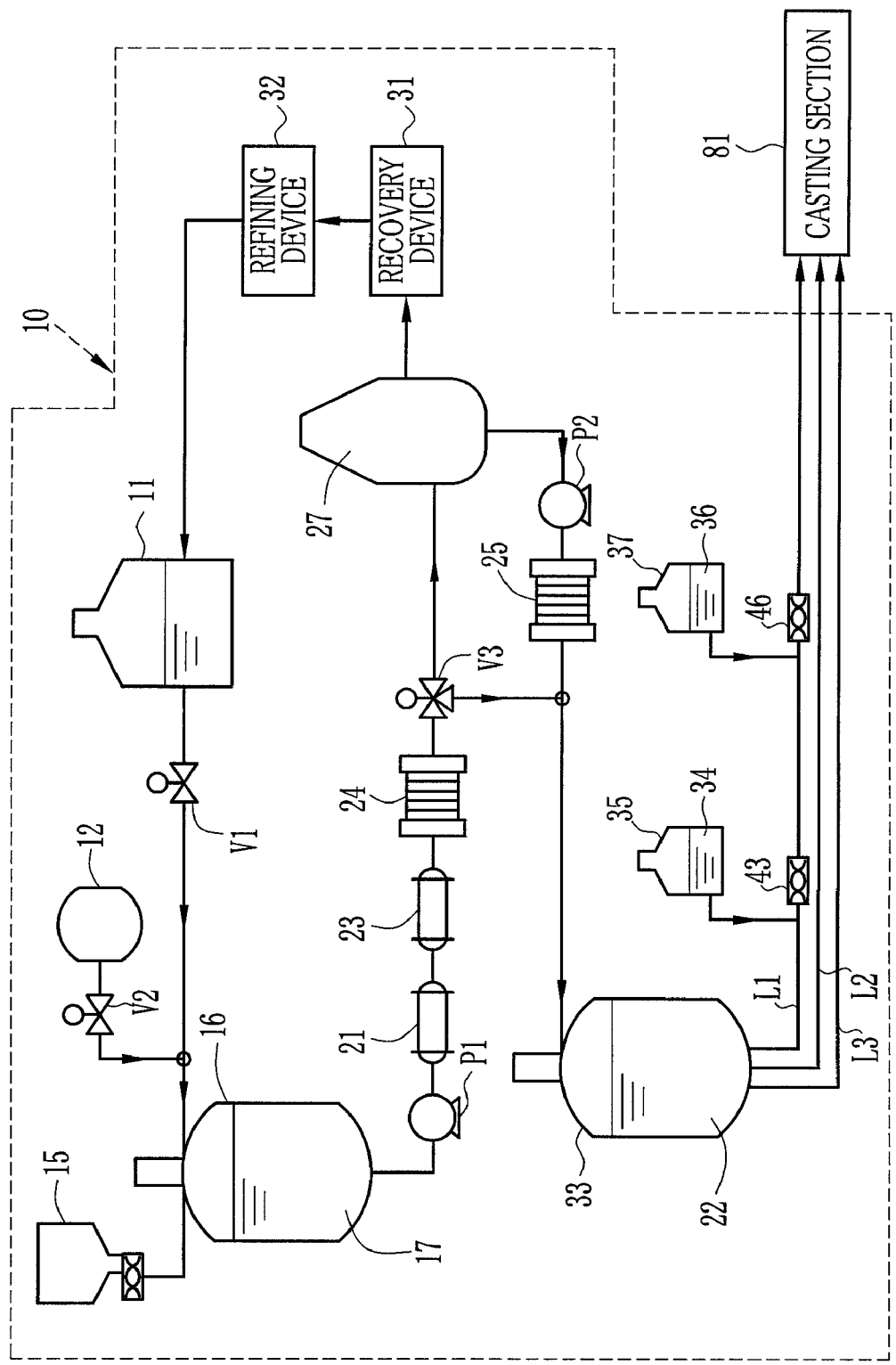
FIG. 3 is a schematic diagram of a dope producing apparatus.

Hereinafter, a producing apparatus and a producing method of the cellulose acylate dope according to the present invention are explained. The following embodiment is an example of the present invention and do not limit the present invention. As shown in FIG. 3, a dope producing apparatus 10 is provided with a first tank 11 for storing a solvent, a second tank 12 for storing a predetermined additive, a hopper 15 for supplying TAC, and a third tank 16 for mixing the TAC and the additive therein. The dope producing apparatus 10 is further provided with a heating device 21 for heating a mixture 17 obtained by stirring the TAC and the additive in the third tank 16, a temperature controlling device 23 for controlling the temperature of the mixture 17 to obtain polymer solution 22, a first filtration device 24, a second filtration device 25, and a flash device 27 for controlling the concentration of the polymer solution 22.

Moreover, the dope producing apparatus 10 is provided with a recovery device 31 for recovering a solvent vapor, and a refining device 32 for refining and recycling the recovered solvent. Furthermore, the dope producing apparatus 10 is provided with a fourth tank 33 for storing the polymer solution 22, a fifth tank 35 for storing dilute liquid 34, and a sixth tank 37 for storing matting liquid 36 including matting agents and cellulose acylate. The fourth tank 33 is connected to a casting section 81, which is described later (see FIG. 5), through first, second and third feed lines L1, L2 and L3. The fifth and sixth tanks 35 and 37 are connected to the first feed line L1.

Figure 4:
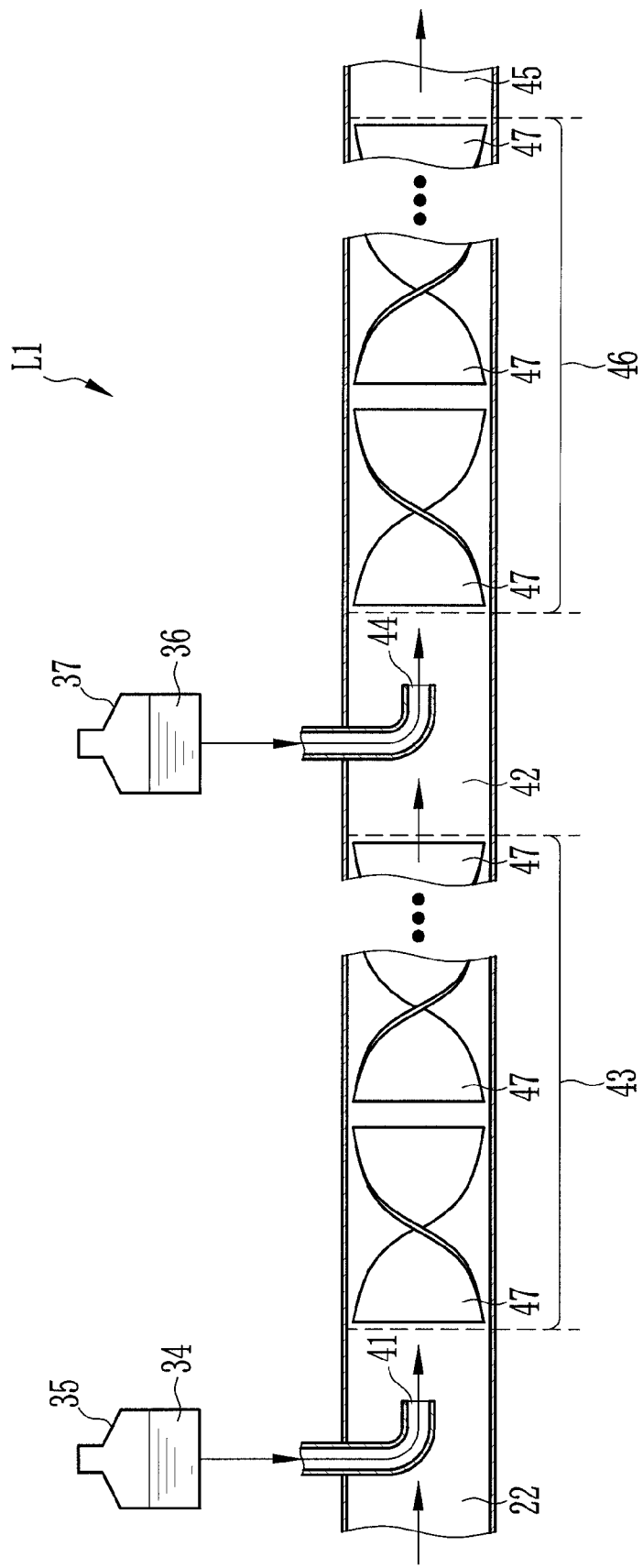
FIG. 4 is a schematic diagram of a substantial part of the dope producing apparatus.

As shown in FIG. 4, the first feed line L1 is provided with a first orifice 41 for adding the dilute liquid 34 to the polymer solution 22, a first inline mixer 43 for inline-mixing the polymer solution 22 and the dilute liquid 34 to produce a mixture liquid 42, a second orifice 44 for adding the matting liquid 36 to the mixture 42, and a second inline mixer for mixing the mixture 42 and the matting liquid 36 to produce a first dope 45.

In this embodiment, a static mixer of twist mixing type equipped with a plurality of mixing elements 47 is used as the first and second inline mixers 43 and 46. Each mixing element 47 is a rectangular plate twisted with respect to the solution sending direction. A sulzer mixer of divide-and-mix type may also be used as the first and second inline mixers 43 and 46. The sulzer mixer is equipped with a plurality of mixing elements each of which is formed by plural thin intersecting plates. The number of the elements 47 of the first and second inline mixers 43 and 46 are respectively determined appropriately, but may preferably be about 10 to 100, and more preferably be about 50.

Instead of the inline mixers, other kinds of mixers may be used to produce the mixture 42 and the first dope 45. In this case, for example, the polymer solution 22 and the dilute liquid 34 are once sent to a stock tank, and the mixture 42 can be produced by mixing the polymer solution 22 and the dilute liquid 34 with use of a rotating stirrer (stirring blade) in the stock tank. The dope 45 can also be produced by mixing the mixture 42 and the matting liquid 36 by the mixer equipped with such stirrer.

Valves V1, V2 and V3 for controlling a liquid feeding amount, and first and second pumps P1 and P2 for feeding the liquid are provided in the dope producing apparatus 10 (see FIG. 3). The positions and the number of the valves and the pumps are properly changed.

Referring back to FIG. 3, the dope producing method with use of this dope producing apparatus 10 is explained. First, the valve V1 is opened to feed the solvent from the first tank 11 to the third tank 16. The TAC in the hopper 15 is sent to the third tank 16 while the amount thereof is being measured. The valve V2 is adjusted to feed a necessary amount of additive from the second tank 12 to the third tank 16. The additive may be dissolved to or dispersed in a solvent. The solvent of the additive is usually the same as the solvent in the first tank 11, but may be changed according to the kind of the additive.

When the additive is in the solid state, it may be fed to the third tank 16 with use of a hopper and the like instead of the second tank 12. When plural sorts of additive compounds are used, an additive solution in which the plural additive compounds are dissolved may be preliminary produced, and the additive solution can be sent from the second tank 12 to the third tank 16. Otherwise plural additive tanks may be used so as to contain the respective additive compounds, which are sent through independent pipes to the third tank 16. When the additive is in the liquid state at room temperature, it may be fed in the liquid state to the third tank 16 without preparing the additive solution.

In the above explanation, the solvent, the TAC, and the additive are sequentially sent to the third tank 16. However, the sending order is not restricted to it. Moreover, the additive may be added to a mixture of the TAC and the solvent in following processes. The internal temperature of the third tank 16 is kept preferably in the range of −10° C. to 55° C. In this embodiment, the mixture 17 is obtained as the polymer solution 22. The polymer solution 22 is a swelling liquid in which the TAC is swollen in the solvent. However, the present invention is not restricted to it.

The first pump P1 is driven so that the mixture 17 is sent to the heating device 21 which is preferably a pipe with a jacket. While the heating device 21 heats the mixture 17 in the swelling liquid state, the dissolution of the solid components proceeds in the mixture 17. The dissolution temperature by the heating device 21 is preferably in the rage of 0° C. to 97° C. Therefore, the heating here does not mean to heat the mixture 17 to room temperature or higher, but means to raise the temperature of the mixture 17 sent from the third tank 16. That is, the heating includes the case that the temperature of the sent mixture 17 is increased from −7° C to 0° C. Moreover, the heating device 21 preferably has a pressuring function for pressuring the mixture 17 so that the dissolution of the TAC to the solvent can efficiently proceed.

In addition to the heating dissolution by the heating device 21, the known cooling dissolution method can also be applied. In the cooling dissolution method, the mixture 17 which is the swelling liquid is cooled to be in the range of −100° C. to −10° C. The solubility in the mixture 17 can be controlled by appropriately selecting the heating dissolution method and the cooling dissolution method in accordance with the nature of each raw material.

The temperature controlling device 23 controls the temperature of the mixture 17, which has been heated by the heating device 21, to approximately room temperature. Owing to this, the polymer solution 22 in which the polymer is dissolved in the solvent is obtained. The polymer solution 22 is filtrated by the first filtration device 24, and thereby insoluble content in the polymer solution 22 is removed. The first filtration device 24 has a filter. An average pore diameter of the filter is preferably not more than 100 μm. A flow rate of the filtration in the first filtration device 24 is preferably not less than 50 liter/hr. The polymer solution 22 after the filtration is sent to the fourth tank 33 through the valve V3 and stored therein.

In the above-described method, the mixture 17 is once produced to be the polymer solution 22. This method requires a longer time as the concentration of the polymer in the solution increases, which decreases the production efficiency. In such case, it is preferable to prepare a polymer solution with a lower concentration, and then to carry out a concentration process to obtain the intended concentration. In order to perform this method, as shown in FIG. 3, the polymer solution 22 having the concentration lower than the predetermined concentration is filtrated by the first filtration device 24, and then sent to the flash device 27 through the valve V3. In the flash device 27, part of the solvent of the polymer solution 22 is evaporated. The solvent vapor generated by the flash evaporation in the flash device 27 is condensed to liquid in a condenser (not shown) and recovered by the recovery device 31. The recovered solvent is refined in the refining device 32 and reused. Such recovery and refining are advantageous to reduce production cost and also to improve production efficiency.

After the concentration, the polymer solution 22 is extracted from the flash device 27 by the second pump P2. In the extraction of the polymer solution 22 from the flash device 27, defoaming is preferably made to remove foams from the polymer solution 22. For the defoaming, there are several methods already known such as ultrasonic irradiation method. The polymer solution 22 is then sent to the second filtration device 25, and the insoluble content therein is further removed. Note that the temperature of the polymer solution 22 in the second filtration device 25 is preferably in the range of 0° C. to 200° C. Thereafter, the polymer solution 22 is sent to and stored in the fourth tank 33.

As shown in FIG. 4, to the polymer solution 22 sent from the fourth tank 33 through the first feed line L1, the dilute liquid 34 stored in the fifth tank 35 is added via the first orifice 41. Then, the polymer solution 22 and the dilute liquid 34 are stirred by the first inline mixer 43, and thereby the mixture 42 is produced. Thereafter, the matting liquid 36 stored in the sixth tank 37 is added via the second orifice 44 to the mixture 42. Then, the mixture 42 and the matting liquid 36 are stirred by the second inline mixer 46, and thereby the first dope 45 is produced. In this way, the matting liquid 36 including the matting agents and the cellulose acylate, and the dilute liquid 34 are added to the polymer solution 22 through independent orifices in the dope producing apparatus 10. Moreover, the dilute liquid 34 is added to the polymer solution 22 prior to the matting liquid 36 in the dope producing apparatus 10. Owing to this, the cellulose acylate concentration in the liquid including the matting agents is not lowered as compared to the initial state (the state as the matting liquid 36). Therefore, the agglomeration of the matting agents can be prevented.

Figure 6:
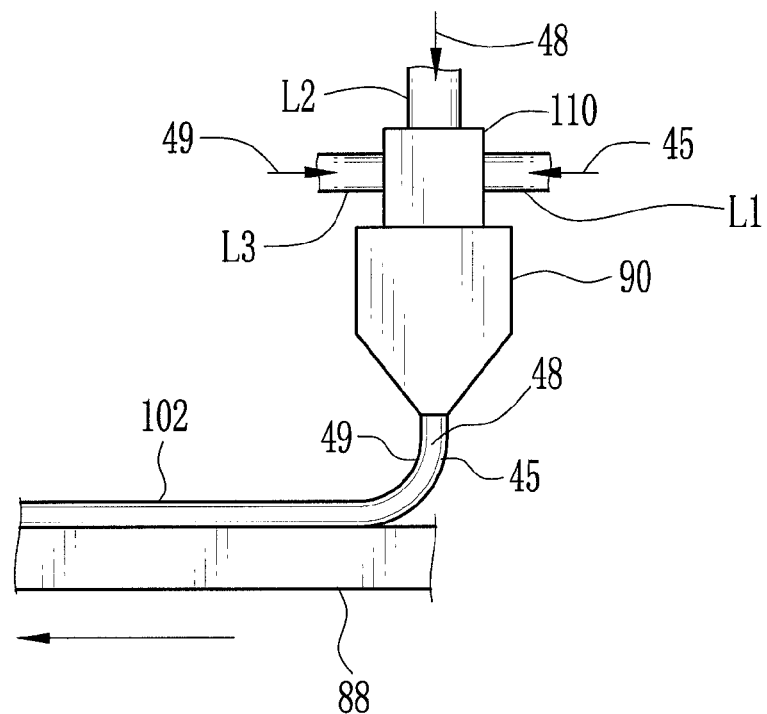
FIG. 6 is an explanatory view illustrating co-casting of three kinds of dopes from a casting die onto a support.

From the fourth tank 33, the polymer solution 22 is sent through the second feed line L2 to the casting section 81 as a second dope 48 (see FIG. 6), and the polymer solution 22 is sent through the third feed line L3 to the casting section 81 as a third dope 49 (see FIG. 6). Note that the dilute liquid 34 and the matting liquid 36 can be added to the polymer solution 22 sent through the third feed line L3. In this case, the dilute liquid 34 is firstly added to the polymer solution 22 and stirred, and the matting liquid 36 is added to the mixture of the dilute liquid 34 and the polymer solution 22 and stirred, as in the case of the first feed line L1. Moreover, the composition of the polymer solution 22 can be different between the first feed line L1 and the third feed line L3. Furthermore, additives other than the dilute liquid 34 and the matting liquid 36 can be added to the polymer solution 22 sent through each feed line L1, L2 and L3. In this case, the additives added to the polymer solution 22 can be different from feed line to feed line.

According to the above-described method, the dope whose TAC concentration is in the range of 5 mass % to 40 mass % can be produced. Note that the solution casting method for producing the TAC film including methods for dissolving materials, raw materials and additives, adding, filtering, and removing voids is explained in detail from [0517] to [0616] of the Japanese Patent Publication No. 2005-104148, and the descriptions thereof can be applied to the present invention.

[Solution Casting Method]

Figure 5:
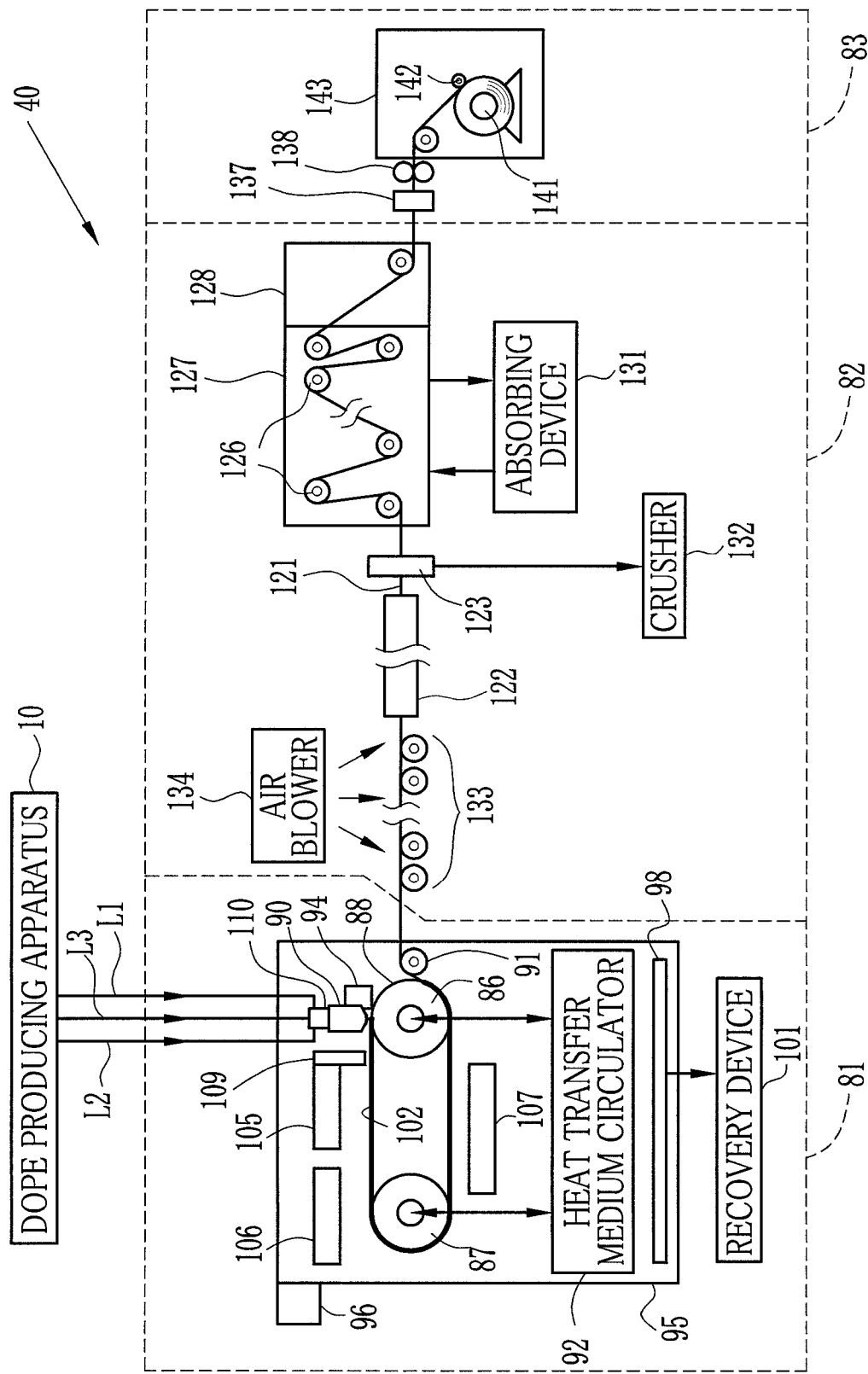
FIG. 5 is a schematic diagram of a solution casting apparatus of the present invention.

Hereinafter, a producing method of a film with use of the above-obtained dope is explained. In FIG. 5, a solution casting apparatus 40 is provided with the casting section 81, a drying section 82, and a winding section 83, besides the dope producing apparatus 10. In the casting section 81, the dope is cast. In the drying section 82, a film sent from the casting section 81 is dried. In the winding section 83, the dried film is wound. There are no clear boundaries among the sections 81 to 83 in the apparatus 40.

In the casting section 81, a belt 88 as a casting support, a casting die 90 for casting the dope onto the belt 88, and a peel roller 91 for peeling the cast dope as a film are provided. The belt 88 is supported by back-up rollers 86 and 87, and continuously runs by the rotation of the back-up rollers 86 and 87. A heat transfer medium circulator 92 for controlling the surface temperatures of the back-up rollers 86 and 87 is connected to the rollers 86 and 87. Moreover, a decompression chamber 94 for controlling the pressure of a rear side of a bead, which is the ribbon-shaped dope formed between the casting die 90 and the belt 88, is provided.

Casting devices such as the casting die 90, the belt 88 and the like are contained in a casting chamber 95. The casting chamber 95 is provided with a temperature controller 96 for controlling the internal temperature of the casting chamber 95, and a condenser 98 for condensing vaporized organic solvent. Outside of the casting chamber 95, a recovery device 101 for recovering condensed and liquefied organic solvent is connected.

In the casting chamber 95, air blowers 105, 106 and 107 for sending air to a casting film 102 are provided. In this embodiment, the air blower 105 is placed above the belt 88 and at upstream side in a transporting direction of the belt 88; the air blower 106 is placed above the belt 88 and at downstream side in the transporting direction of the belt 88; and the air blower 107 is placed below the belt 88, as shown in FIG. 5. However, the present invention is not limited to this. In addition, an air shielding device 109 is provided at downstream from the casting die 90 near the belt 88.

Hereinafter, each of the casting devises provided in the casting section 81 is explained in detail. As shown in FIGS. 5 and 6, a feed block 110 to which the dope is supplied is attached to the casting die 90. A two-phase stainless steel having a mixture composition of an austenite phase and a ferrite phase is preferable for the material of the casting die 90. The material preferably has a coefficient of thermal expansion at most $2\times10^{-5}$ (° C.$^{-1}$). Moreover, the material with almost equivalent anti-corrosion properties as SUS316 in corrosion examination in electrolyte solution can also be used. Furthermore, the material having the anti-corrosion properties which do not form pitting (holes) on the gas-liquid interface after having been soaked in a liquid mixture of dichloromethane, methanol and water for three months is preferable. It is preferable to manufacture the casting die 90 by grinding the material which passed more than a month after casting. Thereby, the dope flows inside the casting die 90 uniformly. It is preferable that the finish precision of a contacting surface of the casting die 90 to the dope and a contacting surface of the feed block 110 to the dope are 1 µm or less of the surface roughness and the straightness are 1 µm/m or less in any direction. Clearance of a slit of the casting die 90 is automatically controlled in the range of 0.5 mm to 3.5 mm. A portion of lip ends of the casting die 90 contacting the dope is processed so as to have a constant chamfered radius R at 50 µm or less throughout the width of the casting die 90. In the casting die 90, shearing speed of the casting dope is adjusted preferably in the range of 1(1/sec) to 5000(1/sec).

The width of the casting die 90 is not particularly restricted, but is preferably 1.1 to 1.5 times wider than that of the film as the end product. The casting die 90 is preferably provided with a temperature controller (not shown) so that the temperature therein at the time of producing the film is maintained to a predetermined value. The casting die 90 is preferably a coat-hanger type. The casting die 90 is provided with bolts (heat bolts) at a predetermined interval in the widthwise direction so that the thickness of the film is automatically adjusted by the bolts. The film thickness here considers factors such as variation of the film thickness, and flatness of the film in the widthwise direction thereof. It is preferable that the bolts set up a profile in accordance with the dope sending amount of a pump (preferably a high-accuracy gear pump) by a predetermined program. It is possible to provide a thickness gauge, such as an infrared thickness gauge (not shown), and execute feedback control of the film thickness by an adjustment program based on a profile of the thickness gauge.

The lip ends of the casting die 90 are preferably provided with a hardened layer. In order to provide the hardened layer, there are methods of ceramic coating, hard chrome plating, nitriding treatment and the like. When ceramics is used as the hardened layer, the preferable ceramics should make the grinding possible, have low porosity and good resistance to corrosion, and is not brittle. As concrete examples of the ceramics, there are tungsten carbide (WC), $Al_2O_3$, TiN, $Cr_2O_3$ and the like. Among them, WC is especially preferable. The hardened layer can be formed by a WC coating in a spraying method.

On both edges of the slit of the casting die 90, the discharged dope is partially dried to be a solid. In order to prevent the solidification of the dope, a supplier (not shown) is preferably provided on both edges of the slit so that a mixed solvent (for instance, made from 86.5 pts.mass of dichloromethane, 13 pts.mass of acetone and 0.5 pts.mass of n-butanol) to which the dope is dissoluble is supplied to each bead edge and the air-liquid interface of the slit. It is preferable that the mixed solvent is supplied at 0.01 ml/min to 10 ml/min to each bead edge so that the casting film 102 is prevented from containing foreign substances. It is preferable that the pump for supplying the dope has a pulsation at most 5%.

The width of the belt 88 is not particularly restricted, but is preferably 1.1 to 1.5 times wider than that of the casting dope. A surface of the belt 88 is preferably polished so as to have the surface roughness of at most 0.05 μm. The belt 88 is preferably made of stainless steel, and its material is SUS316 so as to have enough strength and resistance to corrosion.

It is also possible that the back-up rollers 86 and 87 are directly used as a support. In this case, it is preferable that the rollers 86 and 87 rotate with accuracy to the extent that the rotational unevenness is regulated to at most 0.2 mm. Here, the average surface roughness of the rollers 86 and 87 is preferably at most 0.01 μm. The surfaces of the rollers 86 and 87 are finished by the chrome plating so that the surfaces have enough hardness and durability. Note that it is necessary to minimize the defect on the surface of the support (the belt 88 or the rollers 86 and 87). Specifically, the surface should not have any pinholes whose diameter is 30 μm or above. The surface may have at most one pinhole whose diameter is 10 μm or above and less than 30 μm per 1 m². The surface may have at most two pinholes whose diameter is less than 10 μm per 1 m².

In the drying section 82, a tenter 122, an edge slitting device 123, a drying device 127, and a cooling device 128 are provided. In the tenter 122, a film 121, which is formed from the casting film 102 being peeled from the belt 88, is dried while being stretched in predetermined directions. In the edge slitting device 123 provided downstream from the tenter 122, both side edges of the film 121 are cut off. In the drying device 127, the film 121 whose side edges are cut off is dried while being transported by rollers 126. In the cooling device 128, the film 121 is cooled. An absorbing device 131 is connected to the drying device 127, for absorbing and recovering the solvent vapor generated in the drying device 127. Note that a crusher 132 which shreds the cut edges of the film 121 into chips is connected to the edge slitting device 123. In a transfer area 133 provided between the peel roller 91 and the tenter 122 for transferring the film 121 to the tenter 122, there is an air blower 134.

In the winding section 83, a neutralization device 137 such as a neutralization bar for adjusting the charged voltage of the film 121 to a predetermined value, a knurling roller pair 138 which embosses both side edges of the film 121, a winding roller 141 for winding up the film 121, and a press roller 142 for controlling tension applied to the film 121 at the time of winding are provided. The winding roller 141 and the press roller 142 are provided in a winding chamber 143.

Hereinafter, a producing method of the film using the solution casting apparatus 40 is explained. The back-up rollers 86 and 87 below the casting die 91 are rotated by a drive unit (not shown). The belt 88 runs endlessly by the rotation of the back-up rollers 86 and 87. The casting speed is preferably 10 m/min to 200 m/min. The driving of the back-up rollers 86 and 87 is adjusted such that the tension of the belt 88 becomes 1.5×10⁴9.8 N/m. Relative speed difference between the belt 88 and the rollers 86 and 87 are adjusted to be 0.01 m/min or less. Preferably, speed fluctuation of the belt 88 is 0.5% or less, and meandering thereof caused in the width direction while the belt 88 makes one rotation is 1.5 mm or less. In order to control the meandering, it is more preferable to provide a detector (not shown) and a position controller (not shown) to perform feedback control of the position of the belt 88. With respect to a portion of the belt 88 located directly below the casting die 90, it is preferable that vertical positional fluctuation caused in association with the rotation of the roller 86 is adjusted to be 200 μm or less.

In this embodiment, the surface temperatures of the back-up rollers 86 and 87 are controlled by the heat transfer medium circulator 92. The surface temperature of the belt 88 is preferably controlled to be in the range of −20° C. to 40° C. owing to the heat transfer from the back-up rollers 86 and 87. In this embodiment, a passage (not shown) for a heat transfer medium is formed in the respective rollers 86 and 87. The heat transfer medium maintained at a predetermined temperature passes through the passage to keep the temperatures of the respective rollers 86 and 87 at a predetermined value.

In the present invention, the first dope 45, the second dope 48 and the third dope 49 are cast on the belt 88 so as to form a first surface layer, an inner layer and a second surface layer, respectively. The first surface layer is in contact with the belt 88. The second surface layer is exposed to the air. The inner layer is interposed between the first and second layers, and not exposed outside. The temperatures of the first, second and third dopes 45, 48 and 49 at the time of casting are preferably adjusted to be in the range of −10° C. to 57° C.

The pressure of the rear side of the bead, which is formed between the casting die 90 and the belt 88, is controlled by the decompression chamber 94. Owing to the decompression chamber 94, a form of the bead is stabilized and the bead is prevented from swaying. The internal temperature of the decompression chamber 94 is not particularly limited, but it is preferable that a jacket or the like is attached to the decompression chamber 94 for controlling the internal temperature thereof. Additionally, it is preferable to attach a suction unit (not shown) to an edge portion of the casting die 90 and suctions both sides of the bead in order to keep a desired shape of the bead. A preferable range of an air amount for aspirating the edge is 1 L/min to 100 L/min.

The organic solvent vaporized from the casting film 102 on the belt 88 is condensed by the condenser 98. The condensed organic solvent is collected by the recovery device 101 and reused as the dope preparing solvent.

The evaporation of the solvent in the casting film 102 is proceeded by the dry air from the air blowers 105, 106 and 107. The air shielding device 109 prevents the air which may damage the surface of the casting film 102 from blowing onto the casting film 102 right after the formation thereof. The internal temperature of the casting chamber 95 is regulated preferably in the range of −10° C. to 57° C. by the temperature controller 96.

The drying of the film 121 is proceeded by the dry air at the predetermined temperature blown from the air blower 134 as needed. The temperature of the dry air from the air blower 134 is preferably in the range of 20° C. to 250° C. Note that, in the transfer area 133, it is possible to apply tension to the film 121 in a transporting direction thereof by increasing the rotation speed of the downstream roller in comparison with that of the upstream roller.

In the tenter 122, the film 121 is dried while being transported in a state that both side edges thereof are held with clips or the like. According to this embodiment, the film 121 can be stretched in the widthwise direction in the tenter 122. It is preferable that the film 121 is stretched in the casting direction and/or the width direction in the transfer section 133 and/or the tenter 122 such that the size of the film 121 after the stretching becomes 100.5% to 300% of the size of the same before the stretching.

In the tenter 122, the film 121 is dried to the extent that the remaining solvent amount reaches a predetermined value. After that, the film 121 is sent to the edge slitting device 123, and both side edges of the film 121 are cut off. The cut edges are sent to the crusher 132 by a cutter blower (not shown) and shredded into chips by the crusher 132. Since the chips are recycled as the polymer material for preparing the dope, the materials are efficiently utilized, and therefore the production cost is reduced. The slitting process for the film side edges maybe omitted. However, it is preferable to perform the slitting process after the film is peeled from the belt 88 and before the film is wound in the winding section 83. That is, the edge slitting process is preferably performed between the peeling process and the winding process.

The film 121 whose side edges are cut off is sent to the drying device 127, and further dried therein. In the drying device 127, the film 121 is transported while being bridged across the rollers 126. The internal temperature of the drying device 127 is not particularly limited, but preferably in the range of 10° C. to 150° C. The solvent vapor generated from the film 121 in the drying device 127 is absorbed and recovered by the absorbing device 131. The air from which the solvent is removed is supplied to the drying device 127 as the dry air. The drying device 127 is preferably divided into plural sections so as to change the temperature of the dry air in each section. It is also preferable to provide a predrying device (not shown) between the edge slitting device 123 and the drying device 127 to predry the film 121. Thereby, in the drying device 127, an abrupt increase of the film temperature is prevented so that drastic changes in shape and conditions of the film 121 are prevented.

In the cooling device 128, the film 121 is cooled to approximately room temperature. A moisture controller (not shown) may be provided between the drying device 127 and the cooling device 128. The moisture controller preferably applies air whose temperature and moisture are controlled to predetermined values onto the film 121. Owing to this, the curling of the film 121 and the winding defect of the same during the winding process are prevented.

Then, the charged voltage of the film 121 is controlled to the predetermined value (for example, in the range of −3 kV to +3 kV) by the neutralization device (neutralization bar) 137. The neutralization process is not necessarily performed at this position, but may be performed at desired position in the drying section 82, or at downstream from the knurling roller pair 138. In addition, the number of the neutralization process to be performed may be more than once. The knurling roller pair 138 preferably embosses both side edges of the film 121 to provide knurling. The height of each of projections and depressions of the knurling is preferably in the range of 1 μm to 200 μm.

Finally, the film 121 is wound by the winding roller 141. At the time of winding, the press roller 142 applies tension to the film 121 of desired value. It is preferable to gradually change the tension applied to the film 121 from the start to the end of the winding. In this embodiment, the wound film 121 is 100 m or more in length and 600 mm or more in width.

Since the matting agents are added to the first dope 45 for forming the first surface layer of the film 121, the wound film 121 produced by the solution casting apparatus 40 does not adhere or stick to each other. In addition, since the dilute liquid is added to the first dope 45, the first surface layer can be thinned, therefore the optical properties of the film 121 can be improved. Moreover, the first dope 45 is prepared such that the agglomeration of the matting agents is prevented therein, therefore the optical properties of the film 121 can be improved.

In the solution casting method of the present invention, two or more sorts of dopes may be cast by a simultaneous co-casting method, a sequential co-casting method, or a combination of these methods. When the simultaneous co-casting of two or more sorts of dopes is performed, a feed block may be attached to the casting die, or a multi-manifold type casting die may be used. A thickness of at least one surface layer, which is exposed to outside, of a multilayered film is preferably in the range of 0.5% to 30% to the total thickness of the film. Moreover, in the simultaneous co-casting method, it is preferable that the lower viscosity dope entirely covers over the higher viscosity dope when the dopes are cast onto the support from the die slit. That is, the dopes forming the surface layers are preferably adjusted to have lower viscosity than the dope forming an inner layer interposed between these surface layers. In addition, in the simultaneous co-casting method, it is preferable that an inner dope is covered with dopes whose alcohol ratio is larger than that of the inner dope in the bead, which is formed between the die slit and the support. In the above embodiment, the producing method of the dopes for producing the multilayered film, specifically, the dopes for producing the surface layers of the multilayered film exposed outside is described. However, the present invention is applicable in producing a dope for a single layer film.

Structures of the casting die, decompression chamber, support and the like, drying conditions in the co-casting process, peeling process and stretching process, handling method, winding method after reducing the film curl are precisely described at [0617] to [0889] in the Japanese Patent Laid-Open Publication No. 2005-104148, and the descriptions thereof can be applied to the present invention.

[Properties & Measuring Method]

(Degree of Curl & Thickness)

The Japanese Patent Laid-Open Publication No. 2005-104148 from [0112] to [0139] describes the properties of the wound cellulose acylate film and the measuring method thereof. The properties and the measuring method can be applied to the present invention.

[Surface Treatment]

The cellulose acylate film is preferably used in several ways after the surface treatment of at least one surface. The preferable surface treatments are vacuum glow discharge, plasma discharge under the atmospheric pressure, UV-light irradiation, corona discharge, flame treatment, acid treatment and alkali treatment. It is preferable to make one of these surface treatments.

[Functional Layer]

(Antistatic, Curing, Antireflection, Easily Adhesive & Antiglare Layers)

The cellulose acylate film may be provided with an undercoating layer on at least one of the surfaces, and used in several ways.

It is preferable to use the cellulose acylate film as a base film to which at least one of functional layers is provided. The preferable functional layers are at least one of an antistatic layer, a cured resin layer, an antireflection layer, an easily adhesive layer, an antiglare layer and an optical compensation layer.

These functional layers preferably contain at least one sort of surfactants in the range of 0.1 mg/m² to 1000 mg/m². Moreover, the functional layers preferably contain at least one sort of antistatic agents in the range of 1 mg/m² to 1000 mg/m². The method of providing the functional layers is described in detail at [0890] to [1087] in the Japanese Patent Laid-Open Publication No. 2005-104148.

(Variety of Use)

The produced cellulose acylate film can be effectively used as a protective film for a polarizing filter. In the polarizing filter, the cellulose acylate film is adhered to a polarizer. Usually, two polarizing filters are adhered to a liquid crystal layer, and thereby the liquid crystal display is produced. Note that the arrangement of the liquid crystal layer and the polarizing filters are not restricted to it, and several arrangements already known are possible. The Japanese Patent Laid-Open Publication No. 2005-104148 from [1088] to [1265] discloses the liquid crystal displays of TN type, STN type, VA type, OCB type, reflective type, and other types in detail. The descriptions thereof can be applied to the present invention. Moreover, this publication describes a cellulose acylate film provided with an optical anisotropic layer and that having antireflection and antiglare functions. Furthermore, the produced film can be used as an optical compensation film since being biaxial cellulose acylate film provided with adequate optical properties. The optical compensation film can be used as a protective film for a polarizing filter. The descriptions thereof can also be applied to the present invention According to the present invention, the TAC film with superior optical properties can be obtained. This TAC film can be used as a protective film for a polarizing filter or a base film of a photosensitive material. Moreover, the TAC film is effectively utilized as an optical compensation film for a liquid crystal display device, such as a television, for eliminating the viewing angle dependence, especially when doubled as the protective film for the polarizing filter. Accordingly, the TAC film is applicable not only to the conventional TN mode liquid crystal display, but also to the liquid crystal displays of IPS mode, OCB mode, VA mode and the like.

EXAMPLE 1

In Example 1, the polymer solution 22 was prepared according to the following compositions:

| (1) Polymer solution 22 | |
| --- | --- |
| Cellulose acetate | 98.1 pts. wt |
| Plasticizer A | 7.6 pts. wt |
| Plasticizer B | 3.8 pts. wt |
| UV-absorbing agent A | 0.7 pts. wt |
| UV-absorbing agent B | 0.3 pts. wt |
| Dichloromethane | 320 pts. wt |
| Methanol | 83 pts. wt |
| 1-butanol | 3 pts. wt |

Note that the plasticizer A was triphenyl phosphate (TPP); the plasticizer B was biphenyl diphenyl phosphate (BDP); the UV-absorbing agent A was 2-(2'-Hydroxy-3',5'-di-tert-butylphenyl)benzotriazole; and the UV-absorbing agent B was 2-(2'-Hydroxy-3',5'-di-tert-amylphenyl)benzotriazole.

Next, the dilute liquid 34 and the matting liquid 36 were prepared according to the following compositions:

| (2) Dilute liquid 34 | |
| --- | --- |
| Methanol | 10 pts. wt |
| Chloromethane | 90 pts. wt |
| (3) Matting liquid 36 | |
| $SiO_2$ | 1 pts. wt |
| Polymer solution 22 shown in (1) | 10 pts. wt |
| Dilute liquid 34 shown in (2) | 89 pts. wt |

Note that $SiO_2$ was hydrophobized by alkyl treatment.

The dope was produced with use of the polymer solution 22 of (1), the dilute liquid 34 of (2), and the matting liquid 36 of (3) by the dope producing apparatus 10. Then, the three-layered film 121 was produced from this dope by the solution casting apparatus 40. The number of foreign substances (agglomeration of the matting agent whose particle diameter was 30 μm or more) contained in the film 121 was detected.

The foreign substances were detected by analyzing and digitizing scattering intensity of a laser beam. According to this method, the foreign substances can be detected like in the cross-nicol method. In the cross-nicol method, the foreign substances are detected by observing light transmitted through the film 121, which is interposed between a pair of polarizing plates placed under crossed Nicols. According to the results of the detection, 25 foreign substances were recognized per 5000 $m^2$.

COMPARATIVE EXAMPLE 1

Figure 7:
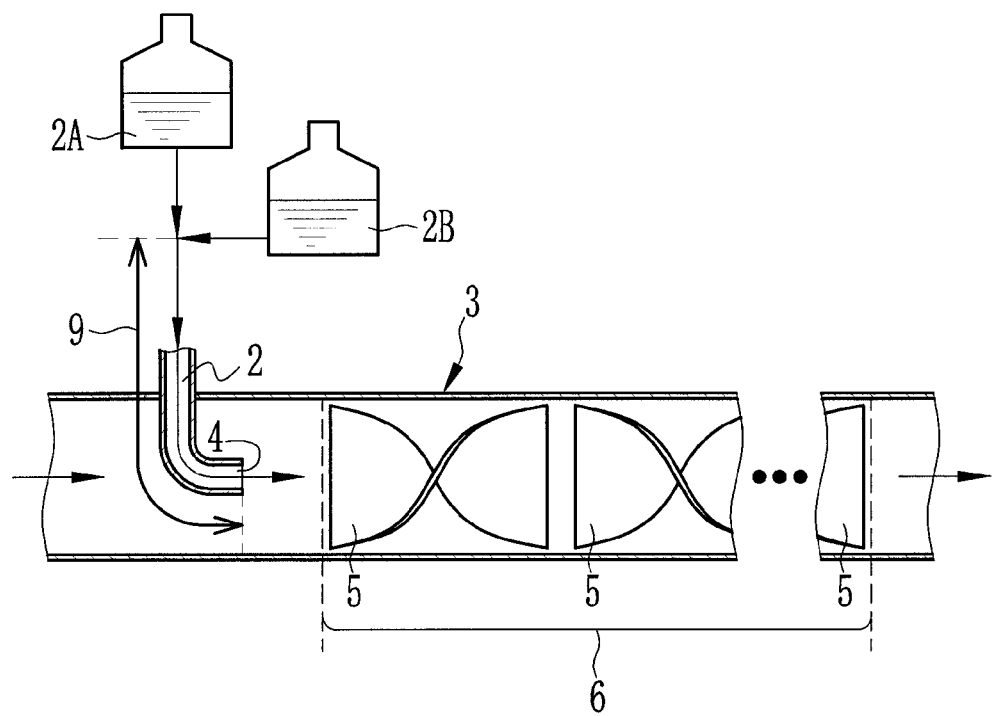
FIG. 7 is an explanatory view illustrating the conventional method for adding the dilute liquid and the matting liquid.

To confirm the effect of the present invention, a dope was produced with use of the polymer solution 22, the dilute liquid 34 and the matting liquid 36 having the same compositions as Example 1 by the conventional dope producing apparatus (see FIG. 7). In the conventional dope producing apparatus, the dilute liquid 34 and the matting liquid 36 were firstly mixed together, and the mixture was added to the polymer solution 22 through one orifice. A three-layered film was produced from this dope by the solution casting apparatus 40, and the number of foreign substances contained in the film was detected. The detection was made according to the same method as Example 1. According to the results of the detection, 75 foreign substances were recognized per 5000 $m^2$.

According to the comparison between Example 1 and Comparative Example 1, it was confirmed that the present invention can prevent agglomeration of matting agents in the dope.

Various changes and modifications are possible in the present invention and may be understood to be within the present invention.

What is claimed is:

1. A solution casting method for producing a multilayered film having a cellulose acylate layer including cellulose acylate and additives, and a matting agent layer including matting agents, said cellulose acylate and said additives, said solution casting method comprising the steps of:
    sending a first dope forming said cellulose acylate layer to a casting die through a first pipe;
    sending a second dope forming said matting agent layer to said casting die through a second pipe;
    adding dilute liquid to said second dope using a dilute liquid supply device provided to said second pipe;
    stirring a mixture of said dilute liquid and said second dope using a first inline mixer provided to said second pipe;
    adding matting liquid including said matting agents and said cellulose acylate to said second dope using a matting agent supply device provided to said second pipe at downstream from said first inline mixer;
    stirring a mixture of said matting liquid and said second dope using a second inline mixer provided to said second pipe;
    casting said first dope and said second dope such that said first dope and said second dope are layered on a running support to form a casting film having said matting agent layer and said cellulose acylate layer;
    peeling said casting film from said support to be a wet film; and
    drying said wet film to be said multilayered film.

2. The solution casting method according to claim 1, wherein the dilute liquid is non-acidic.

3. The solution casting method according to claim 2, wherein the dilute liquid comprises methanol and butanol.

* * * * *